United States Patent [19]

Wang et al.

[11] Patent Number: 5,552,051

[45] Date of Patent: * Sep. 3, 1996

[54] SITE REMEDIATION TECHNOLOGY

[75] Inventors: Lawrence K. Wang, Latham, N.Y.; Lubomyr Kurylko, New Providence, N.J.; Orest Hyrcyk, Syracuse, N.Y.

[73] Assignee: International Environmental Systems, Inc., Latham, N.Y.

[*] Notice: The portion of the term of this patent subsequent to Jun. 16, 2009, has been disclaimed.

[21] Appl. No.: 714,381

[22] Filed: Jun. 11, 1991

Related U.S. Application Data

[62] Division of Ser. No. 550,515, Jul. 10, 1990.

[51] Int. Cl.$^6$ ............................ C02F 3/02; B08B 3/14
[52] U.S. Cl. ........................ 210/604; 210/605; 210/626; 210/631; 134/26; 134/42
[58] Field of Search ...................... 210/603–605, 210/608, 610, 611, 615–618, 620–629, 631, 663, 670, 694, 908, 909; 95/10, 12, 14, 15, 117, 141, 204, 900–903; 134/26, 34, 28–42

[56] References Cited

U.S. PATENT DOCUMENTS

| | | | |
|---|---|---|---|
| 3,946,534 | 3/1976 | Egly | 55/38 X |
| 4,323,372 | 4/1982 | Bentz et al. | 55/68 X |
| 4,407,717 | 10/1983 | Teletzke et al. | 210/631 |
| 4,623,464 | 11/1986 | Ying et al. | 210/631 X |
| 4,689,054 | 8/1987 | Vara et al. | 55/74 X |
| 4,715,965 | 12/1987 | Sigerson et al. | 55/74 X |
| 4,752,306 | 5/1988 | Henriksen | 55/38 |
| 4,810,386 | 3/1989 | Copa et al. | 210/631 |
| 4,820,318 | 4/1989 | Chang et al. | 55/68 |
| 4,846,852 | 7/1989 | Schweitzer et al. | 55/74 X |
| 4,857,198 | 8/1989 | Meidl | 210/631 |
| 4,859,216 | 8/1989 | Fritsch | 55/74 X |
| 4,892,664 | 1/1990 | Miller | 55/53 X |
| 4,937,004 | 6/1990 | Mandrin et al. | 55/53 X |
| 4,952,316 | 8/1990 | Cooley | 210/631 |
| 4,956,093 | 9/1990 | Pirbazari et al. | 210/631 |
| 4,966,611 | 10/1990 | Schumacher et al. | 55/74 X |
| 5,122,165 | 6/1992 | Wang et al. | 55/38 |
| 5,122,166 | 6/1992 | Hyrcyk et al. | 55/38 |
| 5,256,299 | 10/1993 | Wang et al. | 210/664 |

FOREIGN PATENT DOCUMENTS 2127711  4/1984  United Kingdom.

OTHER PUBLICATIONS

O'Brien, R. P. and J. L. Fisher. "There is an Answer to Groundwater Contamination." Water/Engineering & Management, May 1983.

O'Brien, R. P. and M. H. Stenzel. "Combining Granular Activated Carbon and Air Stripping." Public Works, Dec., 1984.

Stenzel, M. H. and U. S. Gupta. "Treatment of Contaminated Groundwaters with Granular Activated Carbon and Air Stripping." Journal of the Air Pollution Control Assoc., Dec., 1985.

*Primary Examiner*—Thomas G. Wyse

[57] ABSTRACT

A biochemical process system and apparatus for removal of toxic volatile organic compounds (VOCs), volatile inorganic compounds (VICs), heavy metals, and surfactants from contaminated soil, liquid and gas streams, by means of combined washing, pH adjustment, biochemical reaction, gas stripping, scrubbing, adsorption and regeneration is described. This process system involves soil washing with surfactant, soil-water separation, liquid pumping; liquid treatment using an enclosed gas stripping bioreactor and dissolved air flotation technology; gas purification using a foam collector, a wet scrubber and a self-regenerative gas-phase granular activated carbon (GAC) contactor; and recycling of GAC-purified gas for further liquid treatment by gas stripping and biochemical reactions. The process system is extremely cost-effective for removal of both volatile and nonvolatile pollutants from a contaminated site and eliminates the problem of secondary gas contamination caused by conventional air stripping towers.

18 Claims, 2 Drawing Sheets

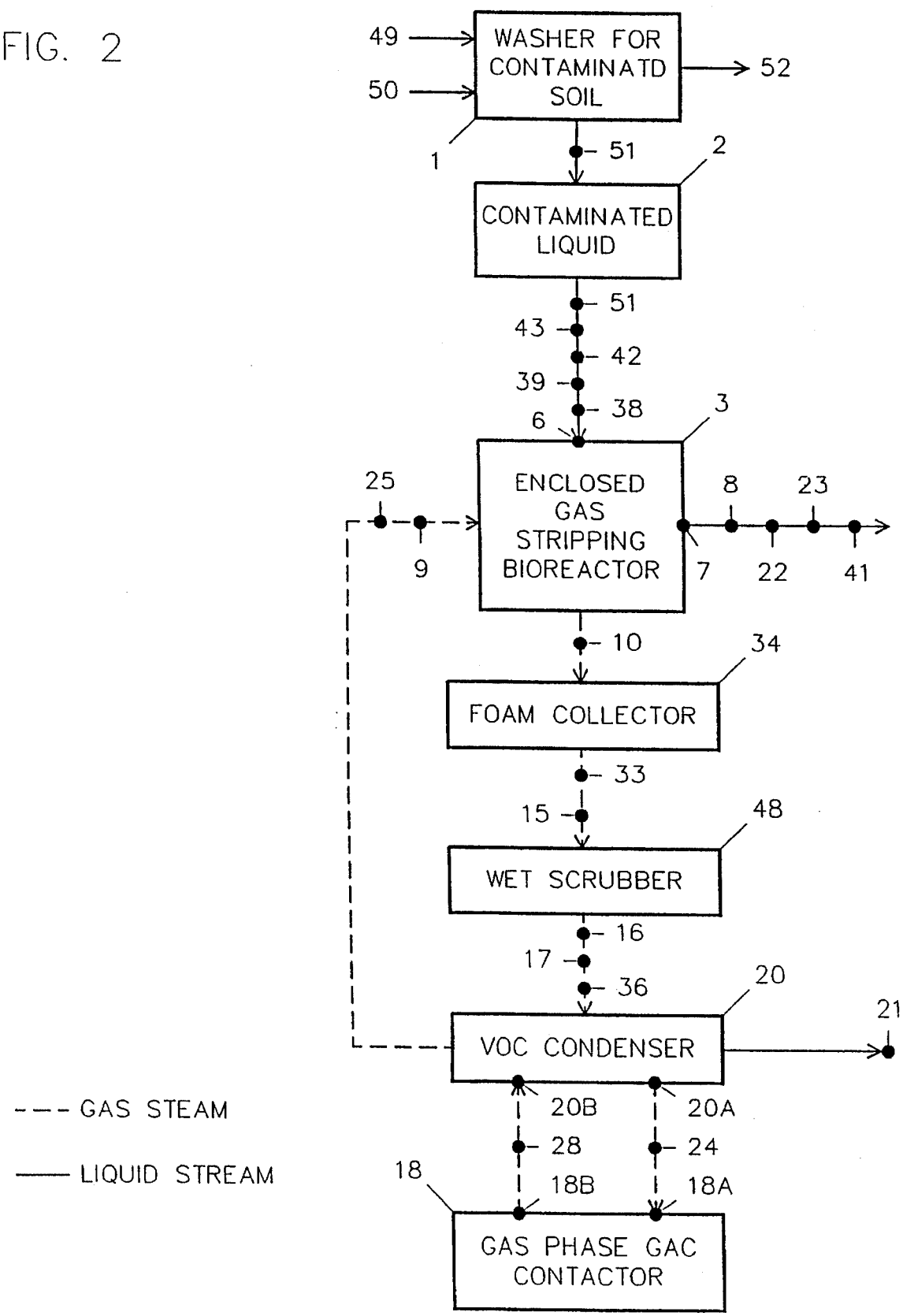

SITE REMEDIATION TECHNOLOGY

This is a division of application Ser. No. 550,515 filed Jul. 10, 1990.

BACKGROUND OF THE INVENTION

The present invention relates to a biochemical process system for treating contaminated soil and liquid to remove toxic volatile organic compounds (VOCs), objectionable volatile inorganic compounds (VICs), heavy metals, and surfactants from a contaminated site. The process system of this invention removes both volatile and nonvolatile pollutants in one apparatus and represents a low cost and highly efficient alternative to present site remediation technology which is expensive and causes secondary pollutions.

The sites which are contaminated by hazardous substances are distributed throughout the entire world, occurring in various geological settings and in urban as well as rural areas. A wide range of volatile chemical wastes has been deposited at various land sites, and the extent and severity of the resulting environmental contamination is unthinkable.

The extent of site remedial action required to protect the public health and welfare is influenced by numerous factors, many of which are site specific. The types of hazardous chemicals present on-site, the potential for migration, the degree of contamination, extent of the area affected, and the costs of remedial action alternatives are all issues that must be considered. Other important issues include the relationship to drinking water sources and population centers, potential secondary pollutions, and the potential for land reuse. Costs of site remediation vary greatly, ranging from several hundred throusand U.S. dollars up to U.S. $25 million per site in 1991. In view of the large number of contaminated sites around the world and the extent of effort required to properly remediate these sites, issues related to site remediation are of international significance.

For a proper site remediation project, both contaminated soil and contaminated groundwater must be cleaned. The contamination becomes very serious if the groundwater is a drinking water source. About 70 percent of potable water in the U.S.A. is supplied by groundwater. Site contamination, which is a national major concern, is about 71 percent caused by industrial accidents (chemical spills, tank leaks, etc.), 16 percent caused by railroad or truck's chemical accidents, and 13 percent caused by leachates from lagoons or dumpsites.

The primary reason for cleaning soil is public health protection. The primary reasons for treating groundwater are: potable use (39 percent), clean-up of aquifer to prevent spread of contamination (48 percent), and industrial and commercial use (13 percent). In any case, the potentially hazardous VOCs must be removed. Timely clean-up of aquifer to prevent spread of contamination is extremely important because the damage can be beyond repair if the spread of contamination is too wide.

Toxic organic compounds commonly found in groundwater include, but are not limited to, the following:

| Organic Compounds in Groundwater | Percent of Occurrences | Concentration Range |
|---|---|---|
| Carbon tetrachloride | 5 | 130 ug/l–10 mg/l |
| Chloroform | 7 | 20 ug/l–3.4 mg/l |
| Dibromochloropropane | 1 | 2–5 mg/l |
| DDE | 1 | 1 ug/l |
| DDE | 1 | 1 ug/l |
| DDT | 1 | 4 ug/l |
| CIS-1,2-dichloroethylene | 11 | 5 ug/l–4 mg/l |
| Dichloropentadiene | 1 | 450 ug/l |
| Diisopropyl ether | 3 | 20–34 ug/l |
| Tertiary methyl-butylether | 1 | 33 ug/l |
| Diisopropyl methyl phosphonate | 1 | 1,250 ug/l |
| 1,3-dichloropropene | 1 | 10 ug/l |
| Dichlorethyl ether | 1 | 1.1 mg/l |
| Dichloroisopropylether | 1 | 0.8 mg/l |
| Benzene | 3 | 0.4–11 mg/l |
| Acetone | 1 | 10–100 ug/l |
| Ethyl acrylate | 1 | 200 mg/l |
| Trichlorotrifloroethane | 1 | 6 mg/l |
| Methylene chloride | 3 | 1–21 mg/l |
| Phenol | 3 | 63 mg/l |
| Orthochlorophenol | 1 | 100 mg/l |
| Tetrachloroethylene | 13 | 5 ug/l–70 mg/l |
| Trichloroethylene | 20 | 5 ug/l–16 mg/l |
| 1,1,1-trichloroethane | 8 | 60 ug/l–25 mg/l |
| Vinylidiene chloride | 3 | 5 ug/l–4 mg/l |
| Toluene | 1 | 5–7 mg/l |
| Xylenes | 4 | 0.2–10 mg/l |
| EDB | 1 | 10 ug/l |
| Others | 1 | NA |

Other common contaminants in groundwater include: volatile inorganic compounds (VICs), surfactants, iron, manganese, calcium hardness, magnesium hardness, coliform bacteria, and virus.

The present technologies for soil cleaning include: surfactant washing, neutralization, solidification, incineration, chemical oxidation, bio-oxidation, lime treatment, venting, etc.

The present technologies for groundwater treatment include: air stripping tower without air emission control, non-regenerative gas phase granular activated carbon, chemical oxidation, non-regenerative liquid phase granular activated carbon, active charcoal fiber, biological processes, ion exchange, ultrafiltration, $H_2O_2$ treatment, reverse osmosis (RO), ozonation, lime softening, ultraviolet (UV), chemical coagulation, sedimentation, filtration and chlorination. Air stripping tower without air emission control is the most common process for VOCs removal, but is not acceptable in many states. Liquid-phase granular activated carbon (GAC) contactor is technically feasible for water purification, but may be economically unfeasible when it is used alone. Chemical oxidation alone or UV alone is not cost-effective for VOCs reduction. Certain chemicals may even give undesirable residuals. Ultrafiltration and RO are excellent post-treatment process, requiring adequate pretreatment for cost reduction. Biological process is very efficient for removal of organic contaminants, but causes air pollution and requires thorough disinfection.

While conventional ozonation, UV, RO and chlorination are all effective disinfection processes, they all require separate reactors.

The present invention represents a package apparatus for removal of VOCs, VICs, heavy metals, and surfactants from contaminated soil and/or contaminated groundwater. It is an efficient and cost-effective site remediation system which considers the affordability, performance, governmental acceptance, secondary pollution elimination, mobility, simplicity in operation, and small requirement in land space.

DESCRIPTION OF THE PRIOR ART

When contaminants are absorbed to the soils above the water table, residual contamination in the soils becomes of great concern since rainwater percolates through the soil and continues to carry the contaminants to the underground aquifier for a very long time. As a result, absorbed contaminants in the soil are the major sources of groundwater contamination.

The technically feasible process systems for soil decontamination include washing, solidification, incineration, chemical oxidation, neutralization, bio-oxidation, venting, lime treatment, etc., of which only washing, bio-oxidation, venting and lime treatment are economically feasible.

Soil washing using plain water is mainly for removal of water soluble inorganics and organics from soils. After soil-water separation, the wash water containing water soluble contaminants can be further treated by conventional physical-chemical or biological processes. If the contaminants in soil include petroleum chemicals and other volatile organics, surfactants are generally used in soil washing. In this case, the wash water after soil-water separation contains high concentrations of volatile organic compounds (VOCs), volatile inorganic compounds (VICs), surfactants and other contaminants which can not be easily or cost-effectively removed by conventional processes. The combination of washing and bio-oxidation is a common approach for treatment of the soil's wash water containing VOCs and surfactants; however, foaming is a problem for conventional bio-oxidation process.

Treatment of contaminated soil with lime is cost-effective, but may destroy vegetation in the environment.

Venting process works by air stripping the contaminated soils in place or off-site. Satisfactory extraction of VOCs by venting may be accomplished without excavation of soils even if the in-situ venting process is selected. The in-situ venting process is reliable, cost-effective, but will take up to five years to clean up a site contaminated by VOCs. Venting is not technically feasible for decontamination of a soil containing non-volatile pollutants.

If a site is contaminated by both volatile and non-volatile pollutants, soil washing and soil-water separation should be the first steps for inexpensive cleanup. The wash water can then be further treated by various liquid treatment processes.

The most common process systems for removal of volatile organic compounds (VOCs), volatile inorganic compounds, surfactants, heavy metals, acids, etc. from a contaminated liquid include flow equalization, pH adjustment, chemical coagulation, flocculation, sedimentation, filtration, conventional air stripping tower, liquid phase granular activated carbon (GAC) adsorption, foam separation, bio-oxidation, chemical oxidation, powdered activated carbon (PAC) adsorption, etc.

Flow equalization requires a separate equalization tank. Conventional chemical coagulation and pH adjustment are done in a rapid mixing tank.

Conventional flocculation is accomplished in a slow mixing tank. Sedimentation clarifier generally requires long detention time, and a large land space. Filtration is the tertiary pretreatment prior to conventional air stripping tower. pH adjustment is an important pretreatment step for ammonia removal. Chemical coagulation, flocculation, sedimentation and filtration together are required for reduction of heavy metals, iron, manganese and hardness prior to conventional bio-oxidation or conventional air stripping and conventional liquid phase GAC for VOC removal.

Conventional air stripping tower is a simple desorption process used to lower the VOCs of a liquid stream. In the process, the contaminated liquid is pumped to the top of a tall packed tower with a countercurrent flow of air drawn through the bottom openings. VOCs are stripped from the falling water droplets into the air stream which is then discharged to the atmosphere. The effluent of air stripping tower is thus purified to lower VOCs and ammonia. For removal of ammonia which is a VIC, lime or caustic soda must be added in a pretreatment tank prior to the conventional air stripping to raise the pH of the liquid to the range of 10.8 to 11.5 converting essentially all ammonium ions to ammonia gas which can then be stripped by air. For removal of VOCs and ammonium ions, a pretreatment process system comprising of chemical coagulation/flocculation, sedimentation and filtration, is generally required prior to the conventional air stripping tower to remove heavy metals, iron, manganese and hardness which, otherwise, will clog the conventional air stripping tower, in turn, will reduce air stripping efficient. Conventional air stripping towers do not recycle their gaseous effluent; therefore, they require air emission control facilities. In addition to high capital cost, conventional air stripping towers have other problems and limitations: (a) poor efficiency in cold weather locations having air temperature below 10 degree C.; (b) not working in freezing conditions unless sufficient heated air is available; (c) objectionable air emission due to ammonia and VOCs discharge into air environment; (d) poor removal efficiency when VOCs and ammonia concentrations in the liquid are low; (e) scale formation due to high heavy metals, iron, manganese and hardness contents in the liquid; (f) objectional tall construction, (g) process restriction for simultaneous combined treatment using chemicals and ultra-violet lights (UV), and (i) incapable of removing surfactants.

While bio-oxidation process is feasible for reduction of both volatile and nonvolatile organics, the surfactant in the contaminated liquid creates a foaming problem.

The gaseous effluent from a conventional air stripping tower is generally treated by gas phase granular activated carbon (GAC) contactors which can not be regenerated in-situ for reuse. The gaseous effluent from a conventional bio-oxidation process (such as activated sludge process, sequencing batch reactor, etc.) is generally not treated, thus creates air pollution problem.

The liquid effluent from a conventional air stripping tower is commonly further treated by a liquid phase GAC contactor which can not be regenerated in-situ for reuse, and therefore its operating cost is high.

The process system and apparatus of this invention significantly simplifies the site remediation system for removal of VOCs, VICs, surfactants, heavy metals, etc. from either a contaminated soil or a contaminated liquid. The flow equalization, pH adjustment, chemical coagulation, enclosed gas stripping bioreactor, foam separation, supplemental chemical oxidation, chemical precipitation, PAC adsorption, clarification, recycled gas emission control, foam collection, wet scrubbing, and GAC regeneration are all accomplished in one package unit for cost saving. The post-treatment for final polishing of the liquid stream by a liquid phase GAC contactor can be added, but is no longer absolutely required. Besides, both the liquid phase GAC for liquid treatment and the gas phase GAC for gas emission control are regenerative in situ for reuse and further cost saving. Recycling of purified gas, for reuse in the enclosed air stripping bioreactor eliminates the air pollution problem.

Conventional air stripping tower can not be cost-effectively operated in conjunction with a bio-oxidation reactor because separate reactors are required. The enclosed gas stripping bioreactor of the present invention, however, incorporates pH adjustment, gas stripping, bio-oxidation, foam separation and clarification into one reactor for more efficient removal of both volatile and nonvolatile pollutants.

In order to clarify the dissimilarities between the present invention and the prior arts, many direct and cross references are reviewed and cited.

Prior process for substantially eliminating dissolved oxygen from a liquid and from a shipping container is described in U.S. Pat. No. 3,946,534, issued Mar. 30, 1976 to Richard S. Egly, which relates to repeated operation by purging the container with inert gas, pressurizing with the gas and then releasing the pressure and repeating the steps for a plurality of times. Egly's patent is particularly directed to elimination of oxygen gas from a liquid, rather than to elimination of toxic volatile organics and volatile inorganics (such as ammonia) from a liquid. However, it is important to illustrate the development of the gas stripping art leading to the present disclosure.

Prior process for recovering volatile organics from exhaust gases or spent air containing these compounds using a layer of silica containing adsorbents is shown in U.S. Pat. No. 4,323,372 issued Apr. 6, 1982, to Rolf Bentz et al. The present invention relates to a process and apparatus for removing VOCs, VICs, heavy metals, and surfactants from a soil or a liquid and also for automatic gas emission control using a foam collector, a wet scrubber and a gas phase GAC contactor which has self-regeneration capability and recycles its purified effluent for the purpose of gas stripping in an enclosed bioreactor.

A prior process for treating liquid with powdered adsorbent, and one or more biological packed towers is described in U.S. Pat. No. 4,407,717 issued Oct. 4, 1983 to Gerald H. Teletzke et al. The present invention discloses an improved site remediation process and apparatus using mainly washing operation, soil-water separation, an enclosed gas stripping bioreactor, a foam collector, a wet scrubber and GAC contactors, but no biological packed towers.

The method and process for combined physicochemical and biological treatment of wastewater using powdered activated carbon (PAC) in an open sequencing batch reactor (SBR) is disclosed by Wei-Chi Ying et al in U.S. Pat. No. 4,623,464 issued Nov. 18, 1986, and in U.S. Pat. No. 4,755,296, issued Jul. 5, 1988. Their method and process removes VOCs from wastewater by PAC adsorption and biological reaction, and converts ammonia (VIC) to nitrate ions. The present invention relates to an enclosed bioreactor for gas stripping, foam separation, bio-oxidation, PAC adsorption, and gas emission control, and for direct removal of VICs and surfactant. Besides the present invention is feasible for soil decontamination, groundwater decontamination, and other waste treatment.

An air purification process is disclosed by Thomas E. Vara et al in U.S. Pat. No. 4,689,054, issued Aug. 25, 1987. The Vara process includes the steps of particulate filtration, adsorption, desorption, separation, incineration and venting. The present invention does not include the steps of particulate filtration, separation, incineration and venting, and relates to soil & groundwater decontamination, and industrial effluent treatment which all with built-in air emission control.

A system for treatment of and mass transfer in liquid/gas mixtures, especially removal of oxygen from seawater, is disclosed by Norolf Henriksen in U.S. Pat. No. 4,752,306, issued Jun. 21, 1988. Henriksen's patent involves oxygen removal by an inert stripping gas. The present invention relates to utilization of air or oxygen for chemical oxidation of ferrous iron and manganese, bio-oxidation of organics, and stripping of volatile substances and surfactants from liquid, in which oxygen is added, not reduced.

A method for separating volatilizable contaminants from soil is disclosed by Adam L. Sigerson et al in U.S. Pat. No. 4,715,965, issued Dec. 29, 1987, which does not relate to the enclosed gas stripping bioreactor for both site remediation and gas emission control as in the case of the present invention.

A two-stage process for purifying wastewater containing organic and adsorbable pollutants in open tanks is disclosed by William M. Copa et al in U.S. Pat. No. 4,810,386, issued Mar. 7, 1989. Their disclosed process includes the steps of aerating the wastewater in the presence of powdered activated carbon (PAC) and biologically active solids in aeration zone, and subsequently settling the suspended solids by gravity in quiescent zone. Their oxygen is provided only for biological growth in opened tanks. The present invention relates to mainly bio-oxidation and physical separation of VOCs, VICs and surfactants by innovative gas bubble stripping (with any kind of gas) in an enclosed bioreactor, and physical adsorption of VOCs by PAC & regenerative GAC, and chemical absorption of VICs.

Chang et al disclose a process for removal of volatile organic compounds from vapor streams using a binderless carbon molecular sieve adsorbent in U.S. Pat. No. 4,820,318, issued Apr. 11, 1989. Another method and apparatus for separating and recovering volatile solvents from vapor streams also using molecular sieve adsorbent is disclosed by Stefan Schweitzer et al in U.S. Pat. No. 4,846,852, issued Jul. 11, 1983. The present invention relates to a process for removal of heavy metals, surfactants, VOCs and VICs from solid, liquid and gas streams by washing, bio-oxidation, gas stripping, scrubbing and adsorption.

Still another method and equipment for recovering volatile organic compounds (VOCs) from exhaust waste gas using active charcoal in fiber form is disclosed by Georges Fritsch in U.S. Pat. No. 4,859,216, issued Aug. 22, 1989. Fritsch's patent further relates to adsorption-desorption steps for active charcoal fiber regeneration and a recirculation step for the gaseous regenerating fluid through the system. The present invention relates to an enclosed gas stripping bioreactor for mainly site remediation with built-in gas emission control, and utilizes combined pH adjustment, chemical reaction, stripping, absorptive scrubbing, bio-oxidation, foam separation, PAC adsorption and regenerative GAC adsorption (instead of active charcoal fiber adsorption) to remove VOCs, VICs, heavy metals, and surfactants from a contaminated site (instead of removing only VOCs from an exhaust waste gas). Furthermore, in the case of the present invention, the purified gas stream (instead of the gaseous regenerating fluid) is recirculated to the enclosed gas stripping bioreactor for liquid treatment.

Meidl discloses a process system for water decontamination by conventional air stripping tower, biological open reactor containing PAC, sedimentation/thickening and wet air oxidation, in U.S. Pat. No. 4,857,198, issued Aug. 15, 1989. The present invention relates to a site remediation process system comprising the steps of soil washing, enclosed gas stripping bio-oxidation, PAC adsorption, GAC adsorption, scrubbing, chemical reaction, flotation, and foam separation, which are aimed at removal of volatile as well as non-volatile pollutants from soil or liquid.

A similar method and system for decontaminating groundwater or other water, is disclosed by Paul C. Miller in U.S. Pat. No. 4,892,664, issued Jan. 9, 1990. Miller's patent relates a process comprising of conventional air stripping tower for groundwater treatment and catalytic oxidation for air purification. Conventional air stripping tower requires pretreatment for pH adjustment, and removal of iron, manganese, and hardness, and requires post-treatment for disinfection. Besides, conventional air stripping tower removes only VOCs and can not receive the gaseous effluent from catalytic oxidation for repeated air stripping. The present invention relates to mainly the enclosed gas stripping bioreactor for removal of VOCs, VICs, heavy metals, and surfactants from a contaminated site. The enclosed gas stripping bioreactor as in the case of the present invention has built-in pretreatment, post-treatment and recirculating air emission control capabilities.

The method for the deoxidation of chlorinated water, more particularly sea water, by means of a low oxygen content stripping gas and a liquid absorbent is disclosed by Charles Mandrin et al in U.S. Pat. No. 4,937,004, issued Jun. 26, 1990. The present invention relates to a process for removal of both volatile and nonvolatile pollutants (instead of chlorine only) from a contaminated site (instead of specifically chlorinated sea water) by means of a high oxygen content stripping gas (instead of a low oxygen content stripping gas).

A single-stage continuous aeration-batch sedimentation clarification process in open tanks for purifying wastewater is disclosed by Curtis D. Cooley in U.S. Pat. No. 4,952,316, issued Aug. 28, 1990. Cooley's patent further relates to the use of PAC in the aeration step. The present invention relates to the enclosed dispersed air stripping process (instead of aeration-sedimentation clarification in open tanks) for both soil/liquid treatment as well as air emission control (instead of only for liquid treatment), and also relates to PAC & GAC contactors (instead of only PAC). Furthermore, Cooley's process is only for purifying wastewater. The process disclosed by the present inventors is feasible for soil decontamination, groundwater decontamination, and industrial effluent treatment.

A continuous chemical pretreatment, aeration and ultrafiltration process for purifying dairy wastewater is disclosed by Massoud Pirbazari et al in U.S. Pat. No. 4,956,093, issued Sep. 11, 1990, which relates to the use of PAC in the aeration step. The present invention is mainly for treatment of either soil or groundwater (instead of only dairy wastewater) by an enclosed dispersed air stripping bioreactor (instead of an open aeration tank containing biological solids and PAC) and PAC - GAC contactors (instead of PAC alone). Furthermore, the process disclosed by the present inventors does not require the use of a chemical pretreatment tank and an ultrafiltration post-treatment unit.

Schumacher et al disclose an apparatus and process for adsorbing VOCs from the flue gas of a combustion unit in one reactor and regenerating adsorbent material in another reactor both for air emission control. Their process system specifically includes adsorption, combustion, humidification, condensation, and heating. The present invention relates to removal of both volatile and nonvolatile pollutants from soil and liquid by washing operation, an enclosed air stripping bioreactor, PAC adsorption, absorption, regenerating GAC, and recycling the purified gas stream for further stripping.

SUMMARY OF THE INVENTION

In accordance with the present invention, an improved biochemical process system for removing volatile organic compounds (VOCs), volatile inorganic compounds (VICs), heavy metals, and surfactants (or surface active agents) from a contaminated site comprises the following steps, facilities and alterations:

washing the contaminated soil with water and surfactants in a washer, separating the washed clean soil and the dirty wash water which is now a contaminated liquid, by gravity sedimentation, discharging the contaminated liquid by pumping and/or gravity into an enclosed gas stripping bioreactor which is equipped with a liquid inlet, a liquid outlet, liquid drains, a gas inlet, a gas outlet, gas release valves, a sparger system, a vacuum breaker, a manhole with cover, an enclosure, chemical feeders, a fine bubble distribution system, vacuum/pressure gauges, a demister pad, a liquid flow meter, a gas flow meter, a gas mover, a foam collector, a VIC wet scrubber, a VOC condenser, a condensed VOC collector, a gas phase granular activated carbon (GAC) contactor, operating valves, regenerating valves, sampling ports, and a gas feed point, adjusting the hydraulic residence time to conform to different influent liquid flow rates and providing sufficient gas head space above the liquid level in said bioreactor, feeding microorganisms, liquid chemicals (including neutralization agents, flocculatants, oxidation agents, precipitation agents, and nutrients), solid chemicals (including powdered activated carbon, or PAC) and gas chemicals into said bioreactor, for combined pH adjustment, chemical reactions, PAC adsorption, and bio-oxidation, bubbling coarse gas bubbles up through the spargers (on said sparger system located at bottom of said bioreactor) into liquid phase with a low pressure and low volume gas mover, stripping residual VOCs, VICs and surfactants from liquid phase into gas/foam phase in said bioreactor by gas bubbles, sucking the gas effluent containing VOCs, VICs and surfactants from the gas outlet of said bioreactor by one or more said gas movers, transporting said gas effluent by the gas mover through a foam collector for removal of surface-active foams, through a wet scrubber for removal of VICs, through the demister pad for removal of liquid droplets, through a VOC condenser twice for VOCs condensation, through a gas phase granular activated carbon (GAC) contactor for further removal of VOCs, and through the gas inlet for re-entering said sparger system, supplying the make-up gas or supplemental gas to said sparger system, when necessary, continuously bubbling coarse gas bubbles including supplemental gas if needed, up through spargers on said sparger system for a plurality of times, treating the liquid inside said bioreactor for a specific residence time by coarse gas bubble stripping, pH adjustment, chemical reactions (including chemical oxidation, chemical precipitation), PAC adsorption and bio-oxidation, separating the insoluble suspended pollutants in/from the bioreactor effluent by clarification, discharging the clarified liquid effluent as the final purified liquid effluent, or into a liquid phase GAC for further treatment before final disposal, recycling a portion of the clarified sludge to said bioreactor for continuous bio-oxidation, and wasting the remaining portion of the clarified sludge, regenerating said gas phase GAC automatically for reuse periodically, replacing absorbing chemical in said wet scrubber, periodically, and draining and collecting the recovered surface-active foams, VOCs and VICs in liquid form.

DESCRIPTION OF THE PREFERRED EMBODIMENTS

Figure 1:
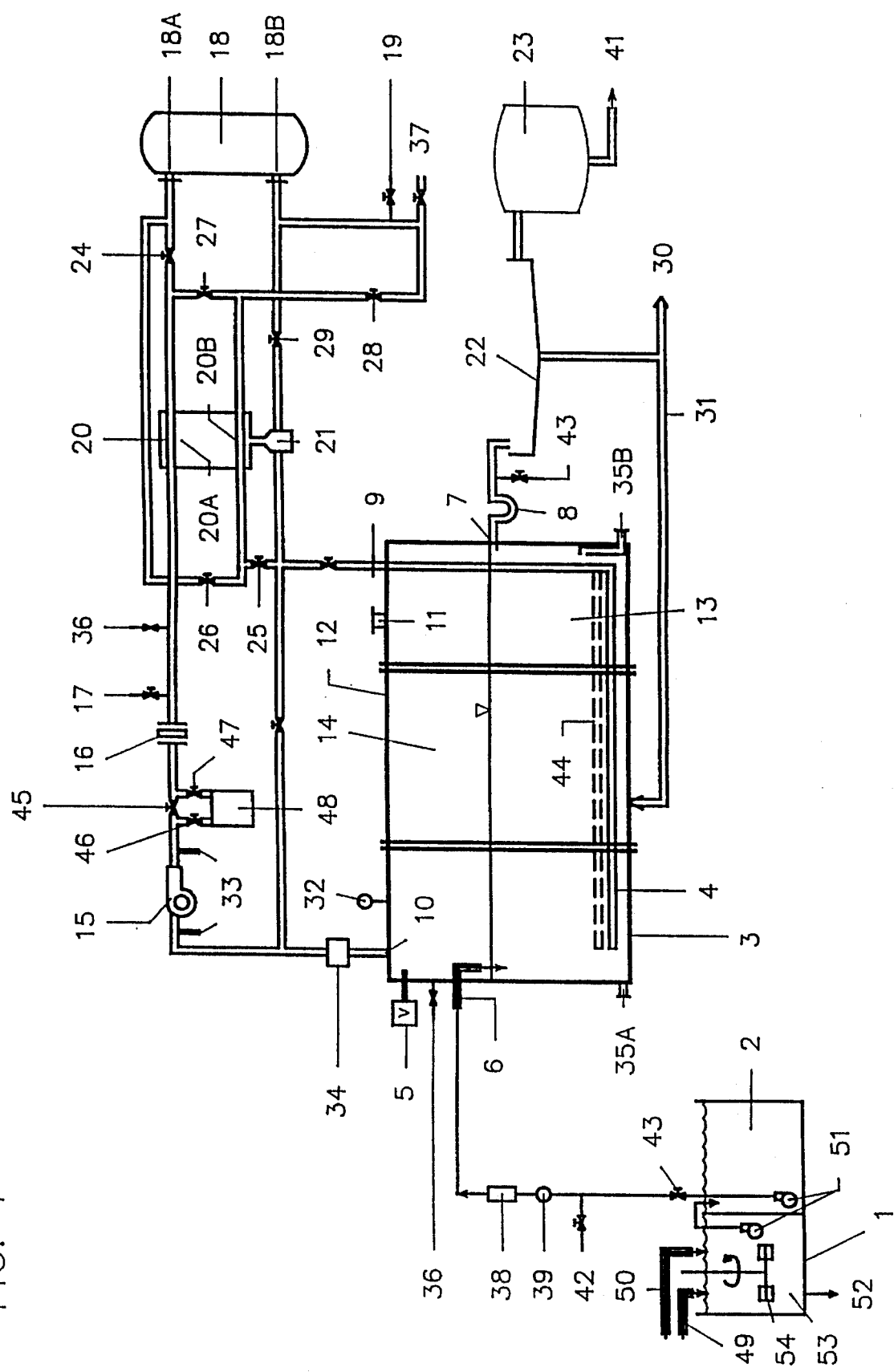

FIGS. 1 and 2 are schematic diagram and flow diagram, respectively of the present invention.

Referring to both FIG. 1 and FIG. 2, the slurry of contaminated soil 49 and surfactant solution 50 are fed to a washer 1 for a thorough washing by a mechanical mixer 54. After soil washing with said surfactant solution 50, the mixture 53 in said washer 1 is allowed to settle when the mixer 54 is turned off. The washed clean soil 52 settles at the bottom of the washer 1 and is discharged in slurry form into a proper facility (not shown) for drying and recycle. The liquid sump pumps 51 feed the wash water which is a contaminated liquid from said washer 1 to an enclosed gas stripping bioreactor 3 through a chemical feed point 39 and a liquid flow meter 38. The enclosed gas stripping bioreactor 3 is equipped with a sparger system 4, a vacuum breaker 5, a liquid inlet 6, a liquid outlet 7 with trap 8, a gas inlet 41 to the sparger system, a gas outlet 10 a manhole cover 11, an enclosure 12, liquid drains 35A & 35B, a fine bubble distribution system 44, a vacuum-pressure gauge 32, a demister pad 16, a gas mover 15, a foam collector 34, gas release valves 36, a wet scrubber 48, a gas phase GAC contactor 18, a VOC condenser 20, a VOC collector 21, a gas flow meter 33, and many control valves for gas sampling 17 & 19, liquid sampling 42 & 43, liquid flow control 42 & 43, and gas emission control 24,25,26, 27,28,29,45,46, & 47.

The enclosed gas stripping bioreactor 3 is constructed to provide sufficient gas head space above liquid level in said bioreactor. Gas bubbles from the sparger system 4 passing through liquid inside bioreactor entrains volatile organic compounds (VOCs), volatile inorganic compounds (VICs) and surfactants (i.e. surface active agents) from liquid phase 13 into gas phase 14.

The gas 14 in said enclosed gas stripping bioreactor 3 containing VOCs and VICs is sucked by the gas mover 15 at the gas outlet 10, and passes through the foam collector 34, the gas flow meter 33, the gas mover 15, the wet scrubber 48, the demister pad 16, the VOC condenser 20, the gas phase GAC contactor 18, the gas inlet 9, and the sparger system 4, thus completing a cycle.

The preferred gas mover 15 is of low pressure (5 to 15 psi) and low volume (500 to 1500 scfm) type.

Any surface-active substances in said liquid generate foam by gas stripping operation in said bioreactor 3. Such foam is condensed and collected by the foam collector 34.

The absorbing chemical in the wet scrubber 48 removes mainly VICs. The demister pad 16 removes liquid droplets.

The dehumidified gas after the demister pad 16 is sampled at the inlet sampling port 17 before the gas stream is further purified by the gas phase granular activated carbon (GAC) contactor 18 mainly for VOCs removal.

The GAC purified gas stream is sampled at an outlet gas sampling port 19, and is recycled to the enclosed gas stripping bioreactor 3 via the reactor gas inlet 9 and the sparger system 4 for continuous liquid purification, aiming at total removal of VOCs, VICs, surfactants and other contaminants.

Majority of VOCs and VICs in the liquid 13 inside said bioreactor 3 are removed by gas stripping operation. The remaining VOCs & VICs, heavy metals, iron, manganese, hardness, bacteria, virus, and other pollutants are treated by chemical reactions with chemicals, bio-oxidation reactions with microorganisms, and adsorption with powdered activated carbon (PAC), in said enclosed gas stripping bioreactor 3.

In a continuous operation, the treated liquid from said enclosed gas stripping bioreactor 3 flows through the liquid outlet 7 and a trap 8, and is discharged for further treatment by dissolved air flotation 22 and/or a liquid phase GAC contactor 23. The final effluent 41 is the purified liquid.

In a batch operation, the coarse gas bubbles provided by the sparger system 4 for stripping removal of VOCs, VICs and surfactants, and for bio-oxidation of microorganisms is stopped when both stripping and bio-oxidation are over. The fine bubble distribution system 44 is then turned on for batch dissolved air flotation (DAF) clarification. After the batch DAF clarification is over in said bioreactor 3, all suspended solids including microorganisms, insoluble chemical flocs, PAC, etc. are floated on the surface of the liquid 13. The subnatant of the liquid 13 is drained first through the liquid drain 35B and discharged into a post-treatment unit (not shown), which is equivalent to a liquid phase GAC contactor 23, which effluent is the purified liquid 41. After the subnatant of the liquid 13 is drained, the floated scum is then drained through another liquid drain 35A thus completing a cycle for batch operation of said enclosed gas stripping bioreactor 3.

Entire gas sparging and recycling system shown in FIG. 1 is completely enclosed, thus eliminating any gas emissions or secondary pollution.

The absorbing chemical in the wet scrubber 45 is specific depending on the type and concentration of VICs to be recovered.

The gas phase GAC contactor 18 has a contactor inlet 18A and a contactor outlet 18B, which both are always open. In normal gas emission control operation, the operating valves 46,47,24,28 & 25 are wide open, and the regenerating valves 45,26,27 & 29 are closed. The gas stream transported by said gas mover 15 enters the wet scrubber 45 through the scrubber inlet valve 46, is purified by the absorbing chemical for VICs removal there, exits the wet scrubber 48, passes through the VOC condenser 20 for the first-stage VOC condensation 20A, enters the gas phase GAC contactor 18 at the contactor inlet 18A for VOC adsorption, exists the gas phase GAC contactor 18 from the contactor outlet 18B, passes through the VOC condenser 20 for the second-stage VOC condensation 20B, and finally re-enters the enclosed gas stripping bioreactor 3 through the bioreactor gas inlet 25 for gas stripping, bio-oxidation and PAC adsorption operations.

Periodically the gas phase GAC contactor 18 needs to be regenerated for reuse. During regeneration, the operating valves 46,47,24,28 & 25 are closed, the regenerating valves 45,26,27 & 29 are open. The volatile substances in said GAC contactor 18 are desorbed by the gas stream transported by said gas mover 15, condensed by the VOC condenser 20 in a double stage condensation 20B & 20A, and collected by the VOC collector 21.

Supplemental gas (such as oxygen) or the make-up gas (such as air) is fed at the gas feed point 37 during normal gas stripping and gas emission control cycle.

For normal gas stripping operation, air is the most cost-effective source of gas available. Supplemental oxygen fed through the gas feed point 37, valves 28 & 25, and the sparger system 4, mixes with air together, produces coarse gas bubbles in said bioreactor 3 for stripping volatile substances, mixing PAC, and removing the remaining VOCs. The combination of bubble stripping, coarse bubble froth flotation (i.e. foam separation), bio-oxidation, and PAC adsorption in one bioreactor 3 has been proven to be extremely effective for reduction of VOCs, VICs, surfactants and heavy metals. The coarse gas bubbles generated from the sparger system 4 also keep the fine bubble distribution system 44 clean at all times, in turn, maintaining the efficiency of the batch DAF, when needed, at maximum.

The coarse gas bubbles generated by the sparger systemic 4 are much greater than 80 microns in diameter, and the liquid 13 in the bioreactor 3 is hydraulically under total turbulent conditions. Total mixing of the contaminated liquid, microorganisms, liquid chemicals, solid chemical (such as PAC) is accomplished by the coarse gas bubbles; thus no mechanical mixer is needed in the bioreactor.

The fine gas bubbles generated by the fine bubble distribution system 44 are all in the range of 20 to 80 microns in diameter, and the liquid 13 in said bioreactor 3 is hydraulically under laminar flow conditions. The fine bubble distribution system 44 is turned on for said batch DAF operation only when the sparger system 4 is turned off.

The microorganisms seeded in the enclosed gas stripping bioreaction 3 for bio-oxidation reaction are aerobic in nature, and convert organic pollutants (including VOCs and surfactants) in the contaminated liquid into carbon dioxide gas, water and other intermediate products in the presence of air or oxygen bubbles.

The present invention is summarized below as a biochemical continuous process.

A biochemical continuous process for removing volatile organic compounds, volatile inorganic compounds, heavy metals, and surface active agents from a contaminated soil 49 comprises the following steps:

(a) mixing and washing the contaminated soil 49 with water and surfactants 50 in a washer 1, thereby producing a mixture 53 of a washed clean soil 52 and dirty wash water, (b) separating the washed clean soil 52 and the dirty wash water by gravity sedimentation, (c) discharging the dirty wash water by pumping, gravity, or by both pumping and gravity, into an enclosed gas stripping bioreactor 3 which is connected to a gas emission control system and equipped with a liquid inlet 6, a liquid outlet 7, liquid drains 35A & 35B, a gas inlet 41, a gas outlet 10, gas release valves 36, a sparger system 4, a vacuum breaker 5, a manhole with cover 11, an enclosure 12, chemical feeders, a fine bubble distribution system 44, vacuum/pressure gauges 32, and a liquid flow meter; said gas emission control system further comprising a gas flow meter 33, a demister pad 16, a gas mover 15, a foam collector 34, a wet scrubber 48, a condenser 20, a condensed volatile organic compounds collector 21, a gas phase contactor 18, operating valves, regenerating valves, sampling ports, and a gas feed point 37; said wet scrubber 48 further comprising an absorbing chemical; said gas phase contactor 18 further comprising a first media, (d) adjusting hydraulic residence time of said bioreactor 3 to conform to different influent liquid flow rates and providing sufficient gas head space above a liquid level in said bioreactor 3, (e) feeding microorganisms and chemicals into said bioreactor 3, for pH adjustment, chemical reaction, and biological reaction; said chemicals being selected from the group consisting of liquid chemicals, solid chemicals, gas chemicals, or combinations, thereof; said solid chemicals consisting of powdered activated carbon, (f) bubbling coarse gas bubbles up through said sparger system 4 into a liquid phase with a low pressure and low volume gas mover 15; said sparger system 4 being located at bottom of said bioreactor 3, (g) stripping residual volatile organic compounds, volatile inorganic compounds and surfactants from the liquid phase into a gas phase and a foam phase in said bioreactor 3 by the coarse gas bubbles; thereby producing a gas effluent containing volatile organic compounds, volatile inorganic compounds and surfactants, (h) sucking the gas effluent from the gas outlet 10 of said bioreactor 3 by said gas mover 15, (i) transporting said gas effluent by the gas mover 15 through the foam collector 34 for removal of the foam phase, through said wet scrubber 48 for removal of volatile inorganic compounds, through the demister pad 15 for removal of liquid droplets, through the condenser 20 twice for condensation of volatile organic compounds, through the gas phase contactor 18 for further removal of volatile organic compounds, and through the gas inlet 41 for re-entering said sparger system 4, (j) supplying a supplemental gas to said sparger system 4, (k) bubbling coarse gas bubbles and the supplemental gas up through said sparger system 4, (l) treating a liquid phase inside said bioreactor 3 by repeating steps (d) to (k) for a plurality of times, thereby producing a bioreactor effluent, (m) discharging the bioreactor effluent through an outlet 7 with a trap 8 into a clarification unit 22; said trap 8 further preventing external gas intrusion into said bioreactor 3, (n) separating the insoluble microorganisms, chemicals, heavy metals, organic compounds, and inorganic compounds from the bioreactor effluent by said clarification unit 22, thereby producing a clarified liquid effluent and a clarified sludge, (o) discharging the clarified liquid effluent from said clarification unit 22 as a final purified liquid effluent, or into a liquid phase contactor 23 comprising a second media for further treatment before final disposal, (p) recycling a portion of the clarified sludge to said bioreactor 3 for continuous biological reaction, and wasting the remaining portion of the clarified sludge, (q) regenerating said first media and said second media for reuse periodically, (r) replacing the absorbing chemical in said wet scrubber 48, periodically, and (s) draining and collecting a recovered foams from the foam collector 34, a liquid volatile organic compounds from the condensed volatile organic compounds collector 21, and a recovered liquid volatile inorganic compounds from the wet scrubber 48.

The present invention is also summarized below as a biochemical batch process.

A biochemical batch process for removing volatile organic compounds, volatile inorganic compounds, heavy metals, and surface active agents from a contaminated soil 49 comprises the following batch steps:

(a) mixing and washing the contaminated soil 49 with water and surfactants 50 in a washer 1, thereby producing a mixture 53 of a washed clean soil 52 and a dirty wash water, (b) separating the washed clean soil 52 and the dirty wash water by gravity sedimentation, (c) discharging the dirty wash water 2 by pumping, gravity, or both pumping and gravity into an enclosed gas stripping bioreactor 3 which is batch operated, connected to a gas emission control system, and equipped with a liquid inlet 6, a liquid outlet 7, liquid drains 35A & 35B, a gas inlet 41, a gas outlet 10, gas release valves 36, a sparger system 4, a vacuum breaker 5, a manhole with cover 11, an enclosure 12, chemical feeders, a fine bubble distribution system 44, vacuum/pressure gauges 32, and a liquid flow meter; said gas emission control system further comprising a demister pad 16, a gas flow meter 33, a gas mover 15, a foam collector 34, a wet scrubber 48, a condenser 20, a condensed volatile organic compounds collector 21, a gas phase contactor 18, operating valves, regenerating valves, sampling ports, and a gas feed point; said wet scrubber 48 further comprising an absorbing chemical; said gas phase contactor 18 further comprising a first media, (d) adjusting hydraulic residence time of said bioreactor 3 to conform to different influent liquid flow rates and providing sufficient gas head space above a liquid level in said bioreactor 3, (e) feeding microorganisms and chemicals into said bioreactor 3, for pH adjustment, chemical reaction, and biological reaction; said chemicals being selected from the group consisting of liquid chemicals, solid chemicals, gas chemicals, or combinations, thereof; said solid chemicals consisting of powdered activated carbon, (f) bubbling coarse gas bubbles and a supplemental gas up through said sparger system 4, (g) treating a liquid phase inside said bioreactor 3 by repeating steps (d) to (f) for a plurality of times; thereby producing a bioreactor liquid, (h) turning off the sparger system 4 inside said bioreactor 3, and stopping to generate coarse gas bubbles with diameter greater than 80 microns, (i) turning on the fine bubble distribution system 44 inside said bioreactor 3, to generate fine gas bubbles with diameter smaller than 80 microns for batch flotation clarification, (j) separating insoluble microorganisms, chemicals, heavy metals, organic compounds and inorganic compounds from the bioreactor liquid by said batch flotation clarification, inside said bioreactor 3, thereby producing a clarified liquid effluent and a clarified sludge, (k) discharging the clarified liquid effluent from the batch operated bioreactor 3 as a final purified liquid effluent, or into a liquid phase contactor comprising a second media for further treatment before final disposal, (l) keeping a portion of the clarified sludge in said bioreactor 3 for further biological reaction, and wasting the remaining portion of the clarified sludge, (m) turning off the fine bubble distribution system 44, and then going back to the very first step for mixing and washing the contaminated soil 49, (n) repeating the batch process cycle steps (a) to (m) for a plurality of times to operate the washer 1, the bioreactor 3, and the gas emission control system, (o) regenerating the first media and the second media for reuse periodically, (p) replacing the absorbing chemical in said wet scrubber 48, periodically, and (q) draining and collecting the recovered foams, volatile organic compounds and volatile inorganic compounds in liquid form.

The coarse gas bubbles or the supplemental gas of the present invention is selected from the group consisting of air, oxygen, or combinations thereof.

The gas phase contactor 18 of the present invention comprises the first media selected from the group consisting of virgin granular activated carbon, regenerated granular activated carbon, chemically treated granular activated carbon, polymeric adsorbents, activated alumina, ion exchange resin, manganese oxide, magnesium oxide, calcite, dolomite or combinations thereof.

The liquid phase contactor 23 of the present invention comprises the second media selected from the group consisting of virgin granular activated carbon, regenerated granular activated carbon, chemically treated granular activated carbon, polymeric adsorbents, activated alumina, ion exchange resin, manganese oxide, magnesium oxide, calcite, dolomite or combinations thereof.

The enclosed gas stripping bioreactor 3 of said biochemical continuous process is of modular construction to be adjusted for treating various hydraulic flow rates.

The dirty wash water 2 is a contaminated liquid which is selected from the group consisting of groundwater, surface water, industrial effluent, sewage, landfill leachate, saline water, or combinations thereof.

The sparger system 4 of the present invention is selected from the group consisting of nozzles, ejectors, porous plates, porous tubes, mechanical gas distribution units, or combinations thereof.

The liquid chemicals of the present invention are selected from the group consisting of lime, sodium hydroxide, potassium hydroxide, sulfuric acid, hydrochloric acid, nitric acid, aluminum sulfate, aluminum chloride, sodium carbonate, magnesium bicarbonate, polymeric aluminum chloride, ferric chloride, ferric sulfate, ferrous sulfate, sodium aluminate, polymer, nutrients, or combinations thereof.

The gas mover 15 of the present invention is a single unit or multiple units.

The sparger system 4 of the present invention creates turbulent hydraulic conditions achieving total mixing, using coarse, dispersed gas bubbles with diameters greater than 80 microns.

The foam collector 34 of the present invention is bypassed when the surfactant concentration in said dirty wash water 2 is low.

The wet scrubber 48 of the present invention is bypassed when the volatile inorganic compounds concentration in said dirty wash water 2 is low.

The fine bubble distribution system 44 of the present invention is turned off or idled when the sparger system 4 is in operation.

The condenser 20 of the present invention is turned off or bypassed when the first media regeneration is done commercially.

The chemical reaction of the present invention is selected from the group consisting of oxygenation with oxygen, neutralization with acid, neutralization with base, precipitation with lime, precipitation with sulfide, precipitation with hydroxide, flocculation with coagulants/flocculants, surface adsorption with surfactants, adsorption with powdered activated carbon, or combinations thereof.

The biological reaction of the present invention is accomplished by microorganisms.

The clarification unit 22 of the present invention is selected from the group consisting of flotation clarification, sedimentation clarification, or both.

The present invention relates to a combined solid-liquid (such as contaminated soil & groundwater) treatment and gas emission control process system, using mainly a washer, an enclosed gas stripping bioreactor, a foam collector, a wet scrubber and a regenerative gas phase granular activated carbon (GAC) contactor, and is specific to removal of volatile organic compounds (VOCs), volatile inorganic compounds (VICs), heavy metals and surfactants from a contaminated site. Removal of VOCs by conventional air stripping tower is hindered by cold temperature, heavy metals, iron, manganese, hardness, and biological fouling. Removal of VOCs by conventional liquid phase GAC is hindered by the non-volatile organics and inorganics competing for available adsorption sites on the liquid phase GAC. Neither conventional air stripping tower nor conventional liquid phase GAC contactor is effective for removal and recovery of VICs, and surfactants. Conventional gas phase GAC contactor recovers VOCs, does not recover VICs and foams, and has air emission problem requiring adequate air pollution measures. The present invention represents an improved process and apparatus comprising the steps of washing, solid-liquid separation, pH adjustment, bio-oxidation (with microorganisms), chemical reactions (including neutralization, coagulation, flocculation, precipitation, softening, powdered activated carbon adsorption), gas stripping, froth flotation (i.e. foam separation), dissolved air flotation (DAF), wet scrubbing, condensation, gas phase GAC adsorption, in one compact apparatus for reduction of VOCs, VICs, surfactants, heavy metals, and other contaminants from contaminated soil, groundwater, industrial effluents, sewage or saline water.

We claim:

1. A biochemical continuous process for removing volatile organic compounds, volatile inorganic compounds, heavy metals, and surface active agents from a contaminated soil comprises the following steps:

(a) mixing and washing the contaminated soil with water and surfactants in a washer, thereby producing a mixture of a washed clean soil and dirty wash water, (b) separating the washed clean soil and the dirty wash water by gravity sedimentation, (c) discharging the dirty wash water by pumping, gravity, or by both pumping and gravity, into an enclosed gas stripping bioreactor which is connected to a gas emission control system and equipped with a liquid inlet, a liquid outlet, liquid drains, a gas inlet, a gas outlet, gas release valves, a sparger system, a vacuum breaker, a manhole with cover, an enclosure, chemical feeders, a fine bubble distribution system, vacuum/pressure gauges, and a liquid flow meter; said gas emission control system further comprising a gas flow meter, a demister pad, a gas mover, a foam collector, a wet scrubber, a condenser, a condensed volatile organic compounds collector, a gas phase contactor, operating valves, regenerating valves, sampling ports, and a gas feed point; said wet scrubber further comprising an absorbing chemical; said gas phase contactor further comprising a first media, (d) adjusting hydraulic residence time of said bioreactor to conform to different influent liquid flow rates and providing sufficient gas head space above a liquid level in said bioreactor, (e) feeding microorganisms and chemicals into said bioreactor, for pH adjustment, chemical reaction, and biological reaction; said chemicals being selected from the group consisting of liquid chemicals, solid chemicals, gas chemicals, or combinations, thereof; said solid chemicals consisting of powdered activated carbon, (f) bubbling coarse gas bubbles up through said sparger system into a liquid phase with a low pressure and low volume gas mover; said sparger system being located at bottom of said bioreactor, (g) stripping residual volatile organic compounds, volatile inorganic compounds and surfactants from the liquid phase into a gas phase and a foam phase in said bioreactor by the coarse gas bubbles; thereby producing a gas effluent containing volatile organic compounds, volatile inorganic compounds and surfactants, (h) sucking the gas effluent from the gas outlet of said bioreactor by said gas mover, (i) transporting said gas effluent by the gas mover through the foam collector for removal of the foam phase, through said wet scrubber for removal of volatile inorganic compounds, through the demister pad for removal of liquid droplets, through the condenser twice for condensation of volatile organic compounds, through the gas phase contactor for further removal of volatile organic compounds, and through the gas inlet for re-entering said sparger system, (j) supplying a supplemental gas to said sparger system, (k) bubbling coarse gas bubbles and the supplemental gas up through said sparger system, (l) treating a liquid phase inside said bioreactor by repeating steps (d) to (k) for a plurality of times, thereby producing a bioreactor effluent, (m) discharging the bioreactor effluent through an outlet with a trap into a clarification unit; said trap further preventing external gas intrusion into said bioreactor, (n) separating the insoluble microorganisms, chemicals, heavy metals, organic compounds, and inorganic compounds from the bioreactor effluent by said clarification unit, thereby producing a clarified liquid effluent and a clarified sludge, (o) discharging the clarified liquid effluent from said clarification unit as a final purified liquid effluent, or into a liquid phase contactor comprising a second media for further treatment before final disposal, (p) recycling a portion of the clarified sludge to said bioreactor for continuous biological reaction, and wasting the remaining portion of the clarified sludge, (q) regenerating said first media and said second media for reuse periodically, (r) replacing the absorbing chemical in said wet scrubber, periodically, and (s) draining and collecting a recovered foams from the foam collector, a liquid volatile organic compounds from the condensed volatile organic compounds collector, and a recovered liquid volatile inorganic compounds from the wet scrubber.

2. A biochemical batch process for removing volatile organic compounds, volatile inorganic compounds, heavy metals, and surface active agents from a contaminated soil comprises the following batch steps:

(a) mixing and washing the contaminated soil with water and surfactants in a washer, thereby producing a mixture of a washed clean soil and a dirty wash water, (b) separating the washed clean soil and the dirty wash water by gravity sedimentation, (c) discharging the dirty wash water by pumping, gravity, or both pumping and gravity into an enclosed gas stripping bioreactor which is batch operated, connected to a gas emission control system, and equipped with a liquid inlet, a liquid outlet, liquid drains, a gas inlet, a gas outlet, gas release valves, a sparger system, a vacuum breaker, a manhole with cover, an enclosure, chemical feeders, a fine bubble distribution system, vacuum/pressure gauges, and a liquid flow meter; said gas emission control system further comprising a demister pad, a gas flow meter, a gas mover, a foam collector, a wet scrubber, a condenser, a condensed volatile organic compounds collector, a gas phase contactor, operating valves, regenerating valves, sampling ports, and a gas feed point; said wet scrubber further comprising an absorbing chemical; said gas phase contactor further comprising a first media, (d) adjusting hydraulic residence time of said bioreactor to conform to different influent liquid flow rates and providing sufficient gas head space above a liquid level in said bioreactor, (e) feeding microorganisms and chemicals into said bioreactor, for pH adjustment, chemical reaction, and biological reaction; said chemicals being selected from the group consisting of liquid chemicals, solid chemicals, gas chemicals, or combinations, thereof; said solid chemicals consisting of powdered activated carbon, (f) bubbling coarse gas bubbles and a supplemental gas up through said sparger system, (g) treating a liquid phase inside said bioreactor by repeating steps (d) to (f) for a plurality of times; thereby producing a bioreactor liquid, (h) turning off the sparger system inside said bioreactor, and stopping to generate coarse gas bubbles with diameter greater than 80 microns, (i) turning on the fine bubble distribution system inside said bioreactor, to generate fine gas bubbles with diameter smaller than 80 microns for batch flotation clarification, (j) separating insoluble microorganisms, chemicals, heavy metals, organic compounds and inorganic compounds from the bioreactor liquid by said batch flotation clarification, inside said bioreactor, thereby producing a clarified liquid effluent and a clarified sludge, (k) discharging the clarified liquid effluent from the batch operated bioreactor as a final purified liquid effluent, or into a liquid phase contactor comprising a second media for further treatment before final disposal, (l) keeping a portion of the clarified sludge in said bioreactor for further biological reaction, and wasting the remaining portion of the clarified sludge, (m) turning off the fine bubble distribution system, and then going back to the very first step for mixing and washing the contaminated soil, (n) repeating the batch process cycle steps (a) to (m) for a plurality of times to operate the washer, the bioreactor, and the gas emission control system, (o) regenerating the first media and the second media for reuse periodically, (p) replacing the absorbing chemical in said wet scrubber, periodically, and (q) draining and collecting the recovered foams, volatile organic compounds and volatile inorganic compounds in liquid form.

3. The process of claim 1 wherein the gas phase contactor comprises the first media selected from the group consisting of virgin granular activated carbon, regenerated granular activated carbon, chemically treated granular activated carbon, polymeric adsorbents, activated alumina, ion exchange resin, manganese oxide, magnesium oxide, calcite, dolomite or combinations thereof; and wherein the liquid phase contactor comprises the second media selected from the group consisting of virgin granular activated carbon, regenerated granular activated carbon, chemically treated granular activated carbon, polymeric adsorbents, activated alumina, ion exchange resin, manganese oxide, magnesium oxide, calcite, dolomite or combinations thereof.

4. The process of claim 1 wherein the enclosed gas stripping bioreactor is of modular construction to be adjusted for treating various hydraulic flow rates.

5. The process of claim 1 wherein the dirty wash water is a contaminated liquid, and is selected from the group consisting of groundwater, surface water, industrial effluent, sewage, landfill leachate, saline water, or combinations thereof.

6. The process of claim 1 wherein the coarse gas bubbles or the supplemental gas is selected from the group consisting of air, oxygen, or combinations thereof.

7. The process of claim 2 wherein the gas phase contactor comprises the first media selected from the group consisting of virgin granular activated carbon, regenerated granular activated carbon, chemically treated granular activated carbon, polymeric adsorbents, activated alumina, ion exchange resin, manganese oxide, magnesium oxide, calcite, dolomite or combinations thereof; and wherein the liquid phase contactor comprises the second media selected from the group consisting of virgin granular activated carbon, regenerated granular activated carbon, chemically treated granular activated carbon, polymeric adsorbents, activated alumina, ion exchange resin, manganese oxide, magnesiums oxide, calcite, dolomite or combinations thereof.

8. The process of claim 1, wherein the sparger system is selected from the group consisting of nozzles, ejectors, porous plates, porous tubes, mechanical gas distribution units, or combinations thereof.

9. The process of claim 1 wherein the liquid chemicals are selected from the group consisting of lime, sodium hydroxide, potassium hydroxide, sulfuric acid, hydrochloric acid, nitric acid, aluminum sulfate, aluminum chloride, sodium carbonate, magnesium bicarbonate, polymeric aluminum chloride, ferric chloride, ferric sulfate, ferrous sulfate, sodium aluminate, polymer, nutrients, or combinations thereof.

10. The process of claim 1 wherein the gas mover is a single unit or multiple units.

11. The process of claim 1 wherein the sparger system creates turbulent hydraulic conditions achieving total mixing, using coarse, dispersed gas bubbles with diameters greater than 80 microns.

12. The process of claim 1 wherein the foam collector is bypassed when the surfactant concentration in said dirty wash water is low.

13. The process of claim 1 wherein the wet scrubber is bypassed when the volatile inorganic compounds concentration in said dirty wash water is low.

14. The process of claim 1 wherein the fine bubble distribution system is turned off or idled when the sparger system is in operation.

15. The process of claim 1 wherein the condenser is turned off or bypassed when the first media regeneration is done commercially.

16. The process of claim 1 wherein the chemical reaction is selected from the group consisting of oxygenation with oxygen, neutralization with acid, neutralization with base, precipitation with lime, precipitation with sulfide, precipitation with hydroxide, flocculation with coagulants/flocculants, surface adsorption with surfactants, adsorption with powdered activated carbon, or combinations thereof.

17. The process of claim 1 wherein the biological reaction is accomplished by microorganisms.

18. The process of claim 1 wherein the clarification unit is selected from the group consisting of flotation clarification, sedimentation clarification, or both.

* * * * *